I. T. INGEBRITSON.
WATERING TROUGH.
APPLICATION FILED FEB. 9, 1914.
1,117,389.
Patented Nov. 17, 1914.
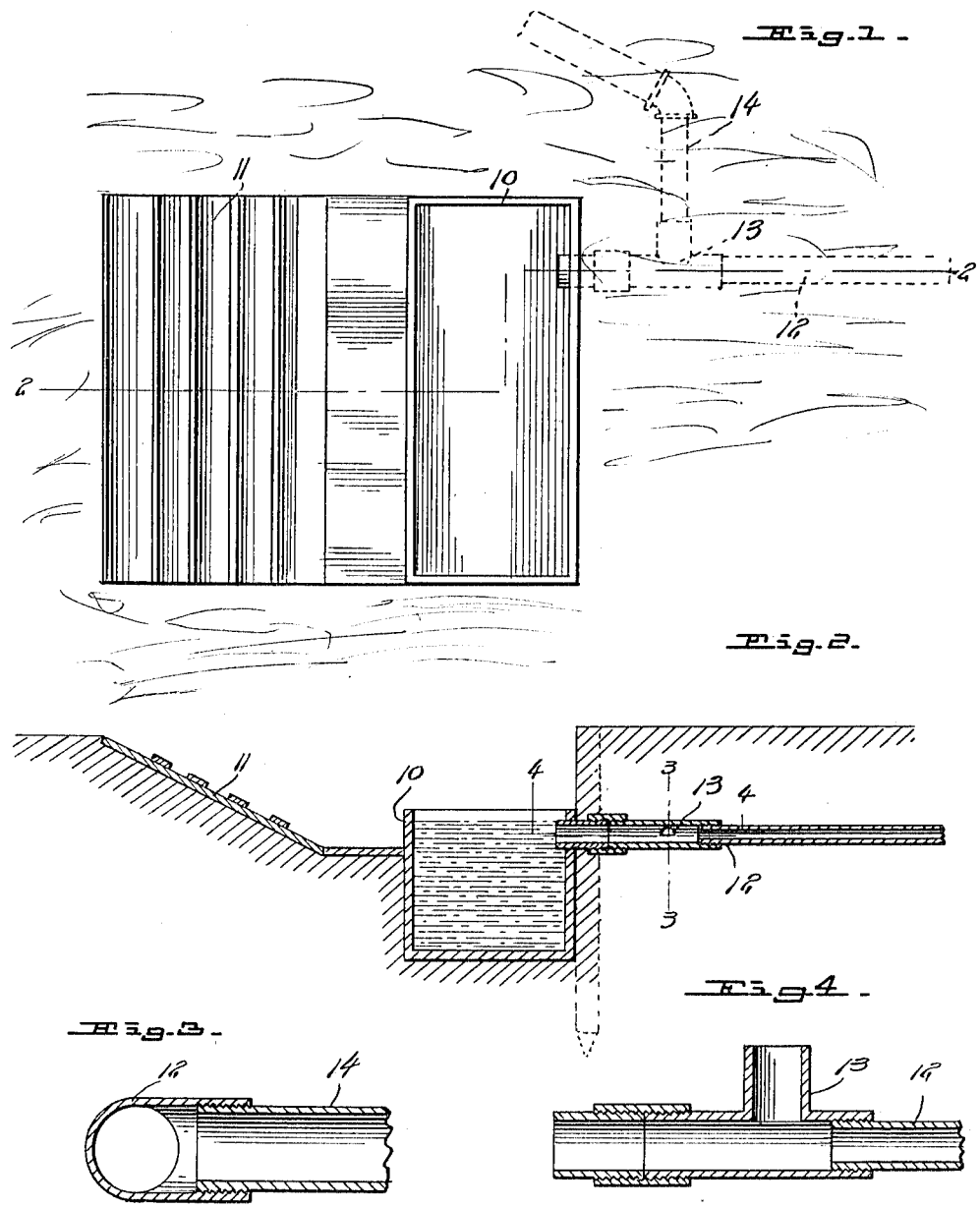

UNITED STATES PATENT OFFICE.

INGABRIT T. INGEBRITSON, OF DUNBAR, IOWA.

WATERING-TROUGH.

1,117,389.  Specification of Letters Patent.  Patented Nov. 17, 1914.

Application filed February 9, 1914.  Serial No. 817,557.

*To all whom it may concern:*

Be it known that I, INGABRIT T. INGEBRITSON, a citizen of the United States, residing at Dunbar, in the county of Marshall, State of Iowa, have invented certain new and useful Improvements in Watering-Troughs; and I do hereby declare the following to be a full, clear, and exact description of the invention, such as will enable others skilled in the art to which it appertains to make and use the same.

This invention relates to improvements in watering troughs and particularly watering troughs used for cattle.

The principal object of the invention is to provide a novel means for carrying off the overflow from the trough.

Another object resides in the peculiar construction and arrangement of the parts whereby the overflow leaves by the same pipe which conveys the water to fill the trough.

Other objects and advantages will be apparent from the following description, when taken in connection with the accompanying drawings.

In the drawings: Figure 1 is a plan view of my trough and the filling and overflow connection. Fig. 2 is a vertical section on the line 2—2 of Fig. 1. Fig. 3 is a transverse section on the line 3—3 of Fig. 2. Fig. 4 is a horizontal sectional view on the line 4—4 of Fig. 2.

Referring particularly to the accompanying drawing, 10 represents a suitable trough which is sunk in the ground, and has an inclined approach 11. Leading into the trough at a proper height is a pipe 12 which is adapted to convey water to the trough from a suitable source of supply. In the pipe 12, adjacent the point of entry into the trough, is a horizontally disposed T-connection 13, the leg of which connects with a pipe 14 leading to a suitable point of deposit for the overflow water.

When water flows or is pumped through the pipe 12 into the trough, the water will fill the trough to such a point as to cover the discharge end of said pipe 12. When this takes place the water in the pipe 12 will be deflected out through the pipe 14 by the resistance offered by the water in the trough. Thus water can be continuously pumped or flowed through the pipe 12 without overflowing the trough. When the water in the trough falls below the level of the end of the pipe 12, water will again issue from the pipe 12 into the trough. The water from the pipe 12 which is deflected off through the pipe 14 will create suction to continuously draw off from the trough the surface water, which is naturally polluted from the dust and dirt and from the mouths of the cattle.

It will be noted that the opening of the T which leads into the leg thereof is semicircular. This prevents the inflowing supply of water from the pipe 12 from passing to the pipe 14 until the trough or tank is full.

What is claimed is:

In a watering trough for cattle, a trough proper, a water conveying pipe discharging into the trough at a suitable height, and a water conveying pipe connected to the first pipe at a point adjacent the point of entrance of the pipe into the trough, said last named pipe being adapted to carry off the overflow from the tank after the water in the trough rises above the first pipe, said last named pipe also conveying the supply flow when the trough overflows.

In testimony whereof, I affix my signature, in the presence of two witnesses.

BERT T. INGEBRITSON.

Witnesses:
 H. C. LOUNSBERRY,
 MARTIN INGEBRITSON.

Copies of this patent may be obtained for five cents each, by addressing the "Commissioner of Patents, Washington, D. C."